United States Patent [19]

Normann

[11] 4,436,254
[45] Mar. 13, 1984

[54] SPINNING REEL FOR FLY-FISHING

[76] Inventor: Carl N. Normann, 2332 Barcelona Way, Sacramento, Calif. 95825

[21] Appl. No.: 367,096

[22] Filed: Apr. 9, 1982

[51] Int. Cl.³ .............................................. A01K 89/01
[52] U.S. Cl. ................................................ 242/84.21 R
[58] Field of Search .................. 242/84.21 R, 84.2 R, 242/84.2 A, 84.2 B, 84.2 C, 84.2 G

[56] References Cited

U.S. PATENT DOCUMENTS

| 2,753,130 | 7/1956 | Sjögren | 242/84.21 R |
| 3,600,964 | 8/1971 | Sarah | 242/84.21 R |
| 4,297,802 | 11/1981 | Normann | 43/21.2 |

FOREIGN PATENT DOCUMENTS 615340 1/1949 United Kingdom ......... 242/84.21 R

Primary Examiner—Billy S. Taylor

[57] ABSTRACT

An improved spinning-reel particularly adapted to long fly-fishing casts with a shooting-head attached to trailing monofilament. The reel comprises a cylindrical solid shaft, with spool on one end, passing concentrically through and rotatably mounted in a hollow shaft, with bail on one end, rotatably mounted in a gear casing; so enabling the spool to rotate inside a stationary bail, and the bail to rotate about a non-rotating spool. The solid and hollow shafts are each driven by a reciprocally mounted gear thereon that may be axially engaged, by an externally controlled common drive selector, with either its pawl or the single, centrally located, crank-drive gear; so that one gear, at a fixed distance from the other, may be driven while the other is retained by its pawl. A rotating spool inside a stationary bail provides twist-free winding, storage and unwinding of a relatively massive, stiff, large-diameter shooting-head. A rotating bail about a non-rotating spool, for conventional retrieval of monofilament with line-twist, enables the monofilament's subsequent axial release with cancelling line-twist and the minimal tension so essential for long casts.

1 Claim, 20 Drawing Figures

SPINNING REEL FOR FLY-FISHING

The present invention relates to fly-fishing with a shooting-head and a trailing monofilament, and more particularly to a fishing reel with a bail and spool either of which may be engaged with a crank and thus be rotated in its predetermined direction, opposite to that established for the other, while the other is prevented from doing so. This reel combines the easy retrieve and axial release of a conventional spinning reel, for said trailing monofilament, with the retrieval, storage and release of conventional fly-reel without axial line-twist for said shooting-head.

Fishing large waters for big fish with casts exceeding 100 feet is a significant and growing segment of fly-fishing. Conventional shooting-heads, with a light-weight trailing monofilament tied to the butt end and a leader attaching a fly to the forward end, are most frequently used to cast such distances. A typical shooting-head weighs 300 grains (0.7 ounce) and is 30 feet long. It comprises a tapered section, increasing in diameter from the forward end to a maximum diameter approximately seven feet removed, integrally joined with the remaining 23 feet of the same maximum diameter.

With the full 30 feet of the shooting-head beyond the fly-rod tip, maximum casting distances are realized by releasing the shooting-head, as a ballistic missile on a desired trajectory with a trailing monofilament, at the instant the shooting-head has attained a maximum linear velocity. Maximum trajectories also require that any tensile forces in the trailing and attached monofilament be kept to a minimum.

While wading, long fly-fishing casts are conventionally made by releasing those coils of monofilament that have previously been stripped from the fly-reel, suspended from the fly-caster's mouth and partially submerged in water. Replacing that appreciable resistance to flight of the submerged monofilament with the minimal impedance offered by the axial release of said monofilament directly from a fixed arbor of a spinning-reel has resulted in a casting-distance increases of up to 50 percent. After fishing out any cast, the trailing monofilament is wound onto the spool of a conventional spinning-reel with an axial line-twist of approximately 360 degrees per revolution of the bail about a non-rotating spool. Although acceptable for conventional limp, small-diameter monofilament, such line-twist magnitude will cause unacceptable, residual, coiled deformations in a conventional stiff, large-diameter shooting-head. Such deformations significantly increase air-resistance during the forward flight of said shooting-head, resulting in a lesser casting distance, and prevent laying the shooting-head straight on the water, which is so essential to distance casting.

Reference is made to a document submitted to and filed by the U.S. Patent and Trademark Office on July 16, 1981. It was assigned Disclosure Document No. 101,521. This document has three sections; only that section titled Spinning-Reel for Fly-Fishing pertains to this application.

Reference is taken to U.S. Pat. No. 4,297,802, dated Nov. 3, 1981, titled Line Routing and Storing Device, which enabled replacement of the significant resistance to flight of submerged monofilament with minimal impedance offered by the axial release of said monofilament directly from a fixed arbor. The present invention has the following advantages over said Line Routing and Storing Device:

1. A single reel replaces the combination of conventional fly-reel and said Line Routing and Storing Device.
2. Line retrieval is easier and faster.
3. Wading depth is limited only by fishing-wader height rather than by the waist-belt mount of said Line Routing and Storing Device.
4. Line routing is eliminated by storage of line on reel.
5. Stripping stored monofilament from fixed arbor and winding same onto fly-reel, preparatory to playing a hooked fish off reel, is eliminated by storage of line on reel of present invention.

The embodiment of the present reel illustrated in this specification has provisions for conventional level-winding and adjustable drag when one of said bail and spool is operably engaged by said crank.

Objects of the present invention are significantly longer casts, easier retrieves and prevention of axial twists in conventional shooting-head. Another object is to provide a durable reel that is light-weight and easy to use. These objects, advantages and features of the invention will be better understood from the following detailed description for a right-hand fly-caster, reference being made to the accompanying drawing in which.

In the following descriptions, the sense of clockwise and counterclockwise rotation will be given as seen in either of the two directions. One direction is perpendicular to the plane of FIG. 2, looking from crank toward gear-case. The other direction is along spool axis, looking from exposed end of spool toward gear-case.

Figure 1:
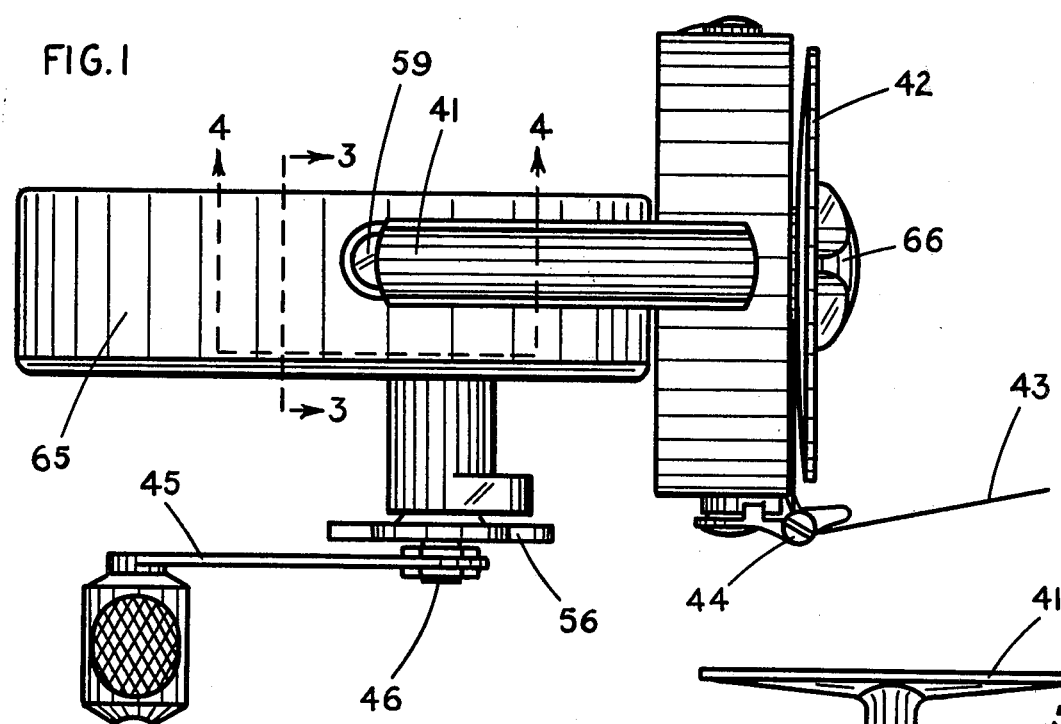
FIG. 1 is a top view of one embodiment of the invention.
Figure 2:
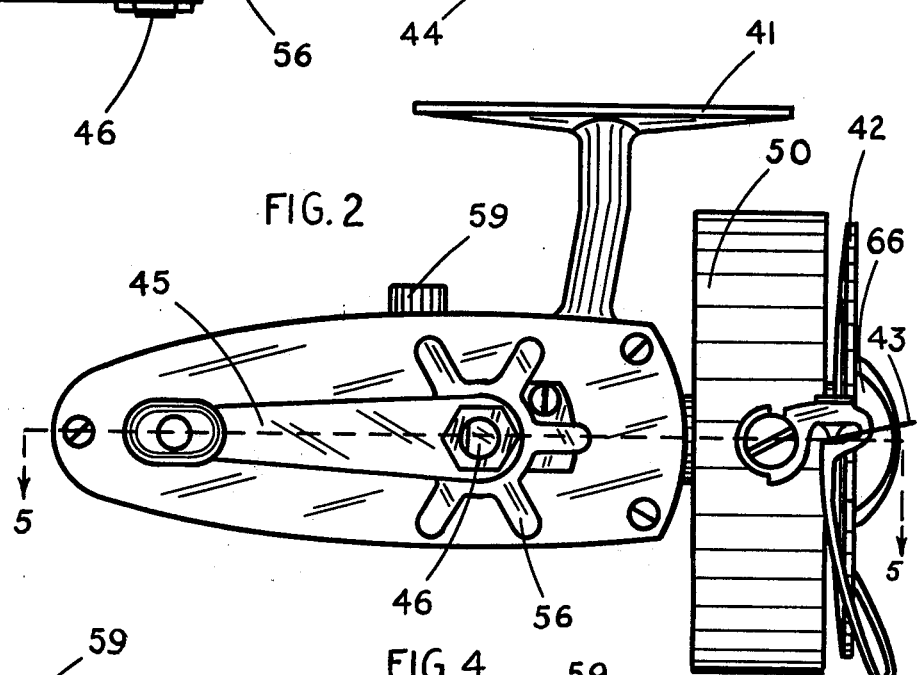
FIG. 2 is a side elevational view of said embodiment.

Referring to FIG. 2, foot 41 is conventionally mounted in fly-rod reel-seat with exposed end of spool 42 facing stripping-guide of said rod to which line 43 is directed from bail 44. For right-hand retrieve, crank 45 appears as shown in FIG. 1.

Figure 5:
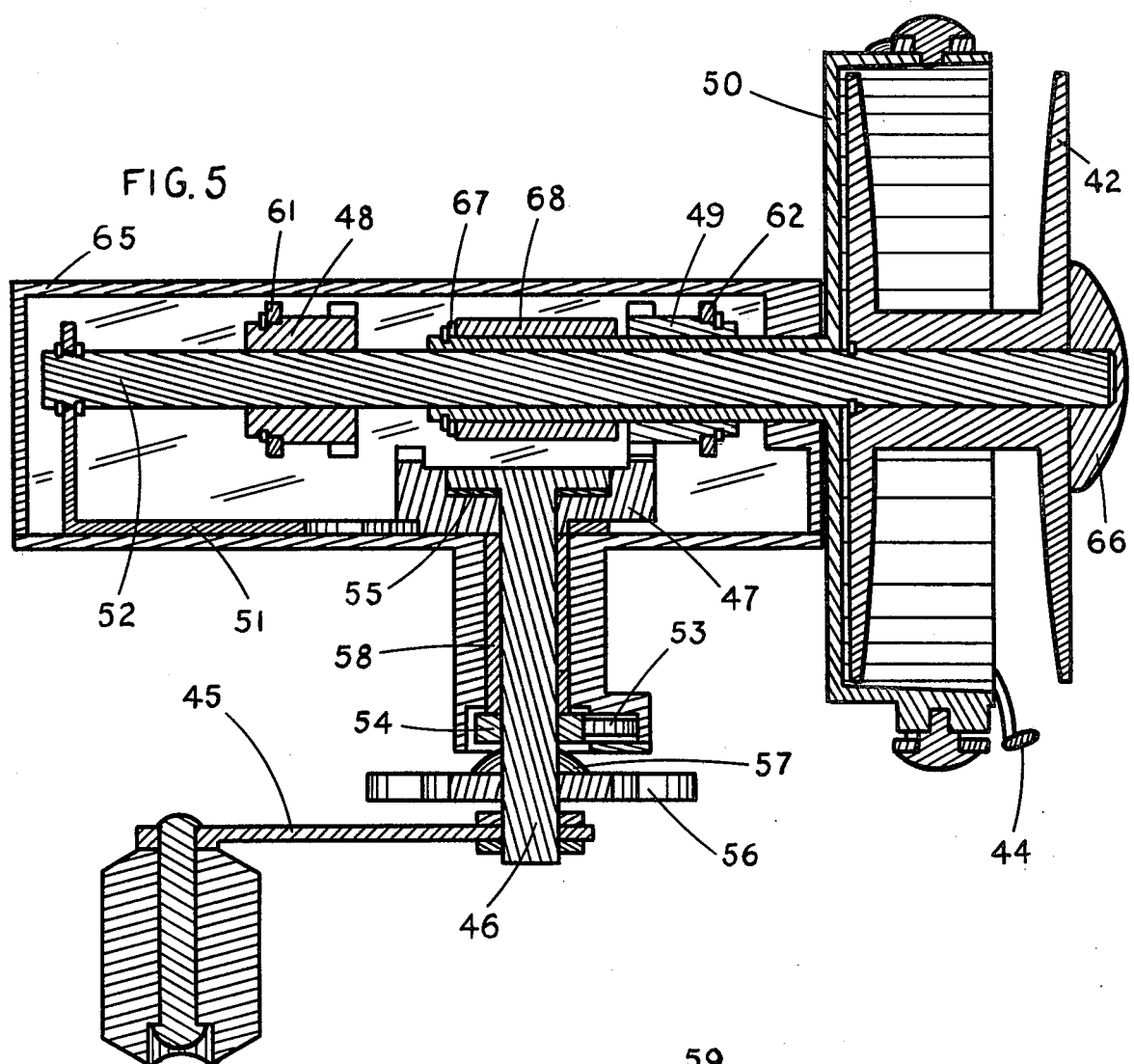
FIG. 5 is an enlarged sectional view, at section-line 5—5 of FIG. 2, of said embodiment.

With reference to FIGS. 2 and 5, conventional clockwise rotation of crank 45 in this embodiment drives attached crankshaft 46 and drive-gear 47 clockwise causing spool-gear 48, when engaged, to rotate spool 42 clockwise and bail-gear 49, when engaged, to rotate skirt 50 and bail 44 counterclockwise. Said rotation of drive-gear 47 also causes reciprocation of side-arm 51, attached spool-shaft 52 and spool 42.

The present invention comprises cranking means, crank anti-reverse means, drag means, drag adjusting means, bail means, spool means, drive selector means, spool stop means, bail stop means and spool reciprocating means.

Said cranking means comprise crank 45, attached crankshaft 46 and drive-gear 47.

Said crank anti-reverse means comprise spring-loaded pawl 53 and engaged ratchet-wheel 54 attached to crankshaft 46.

Said drag means comprise friction-washer 55 of suitable material compressed between abutting surfaces of head of crankshaft 46 and drive-gear 47.

Said drag adjusting means comprise star-wheel 56 and spring-cup-washer 57; said star wheel threads onto crankshaft 46 compressing said spring-cup-washer against ratchet-wheel 54 and sleeve 58, which in turn force drive-gear 47 to compress friction-washer 55 between it and head of crankshaft 46.

Said bail means comprise skirt 50 and bail 44.

Said spool means comprise spool-shaft 52 and spool 42 secured on said spool-shaft between snap-ring and retaining nut.

Said drive selector means comprise shaft-knob 59, shift-rod 60, yoke 61, and yoke 62; which is a duplicate of yoke 61.

Said spool stop means comprise pawl 63 which can be operably engaged with spool-gear 48 to permit the latter to rotate in clockwise direction only.

Said bail stop means comprise pawl 64, which is so located and oriented when engaged with bail-gear 49 to permit latter to rotate only in counterclockwise direction.

Said spool reciprocating means comprise slide-arm 51 and 3-tooth portion of drive-gear 47.

Referring to FIG. 5, in explanation of the functioning of one embodiment of the invention, counterclockwise rotation crankshaft 46 is prevented by said crank anti-reverse means. Clockwise rotation of crank 45 drives said crankshaft clockwise. Clockwise rotation of crankshaft 46 is transmitted to drive-gear 47 by said drag means. Clockwise rotation of 3-tooth portion of said drive-gear causes reciprocating motion of slide-arm 51, attached spool-shaft 52 and spool 42 to enable level-winding of line 43 onto said spool.

Figure 3:
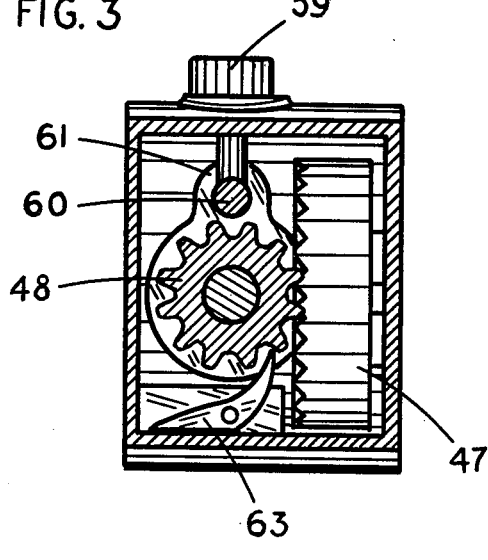
FIG. 3 is an enlarged sectional view, at sector-line 3—3 of FIG. 1, illustrating a spool-gear, pawl and drive-gear.
Figure 4:
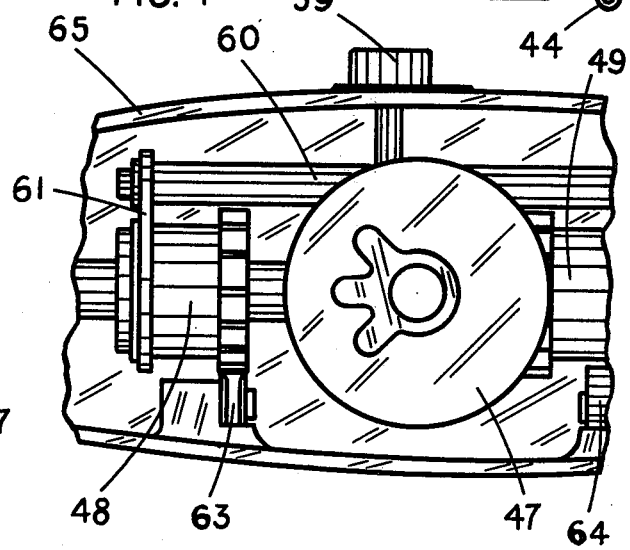
FIG. 4 is a second enlarged sectional view, at section 4—4 of FIG. 1, of said spool-gear, pawl and drive-gear.
Figure 6:
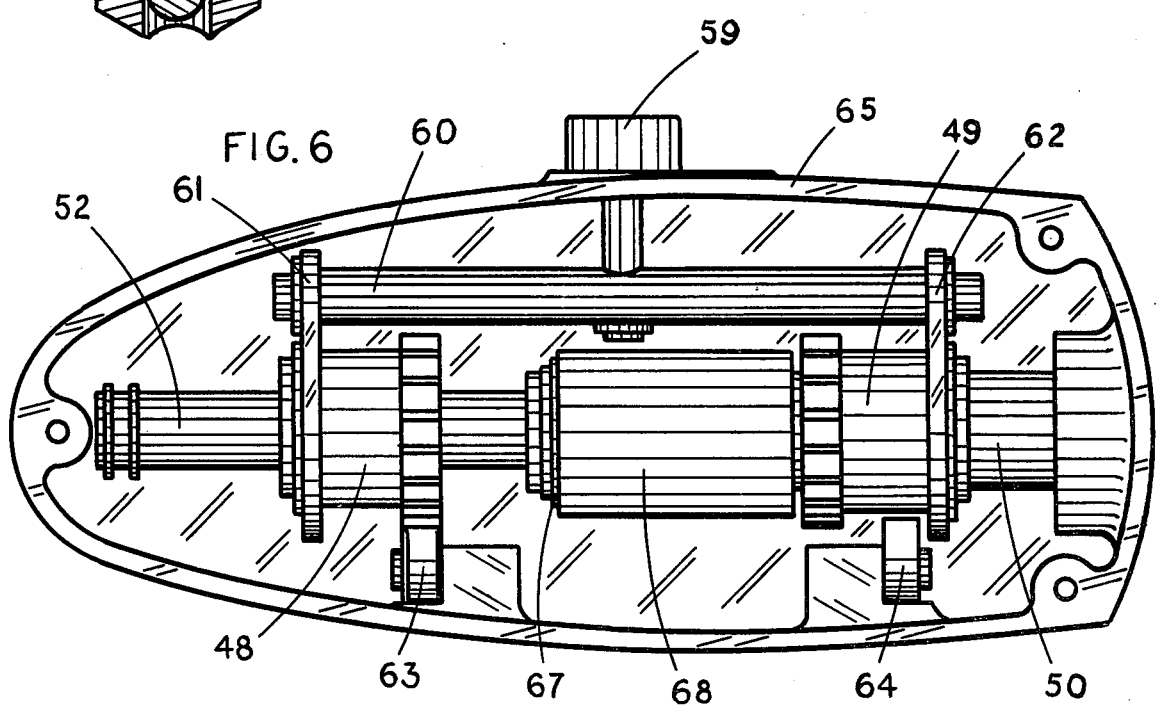
FIG. 6 is an enlarged side elevation view of gear-case with cover and slide-arm removed.
Figure 7:
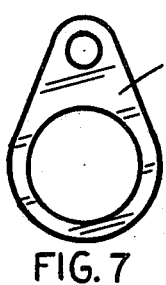
FIG. 7 through FIG. 20 illustrate detailed parts of said embodiment.
Figure 8:
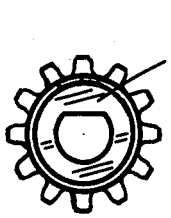
Figure 9:
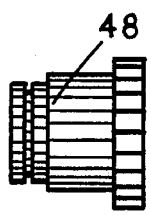
Figure 10:
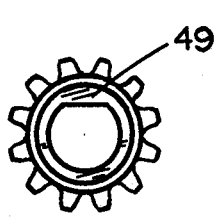
Figure 11:
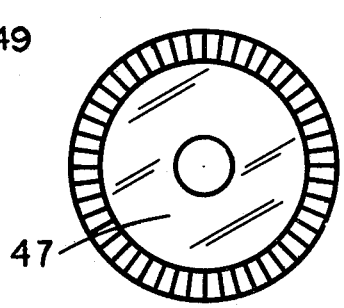
Figure 12:
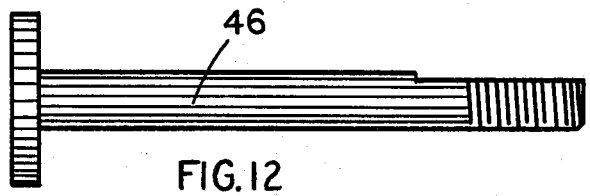
Figure 13:
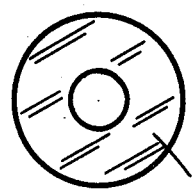
Figure 14:
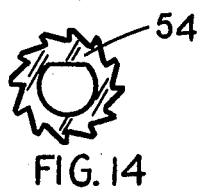
Figure 15:
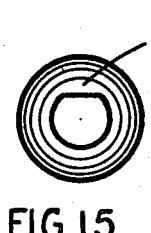
Figure 16:
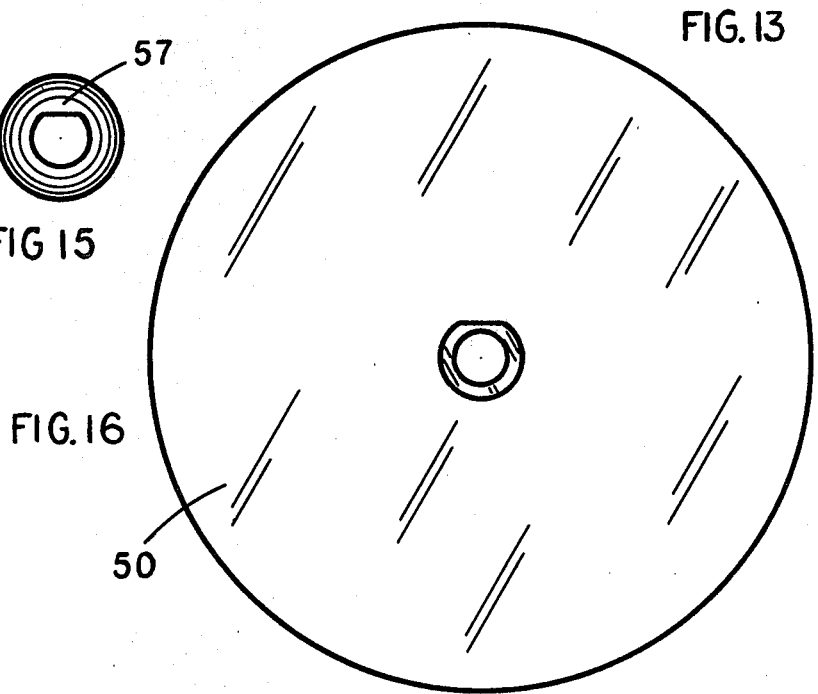
Figure 17:
Figure 19:
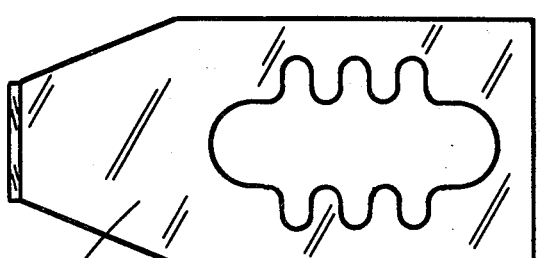
Figure 18:
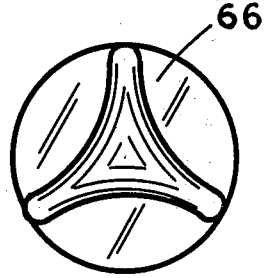
Figure 20:

FIGS. 3, 4 and 6 illustrate the drive selector means of this embodiment. The arrangement and spacing of parts are such as to permit engagement of drive-gear 47 with only one of spool-gear 48 and bail-gear 49 at any one time. The location and length of slot in gear-case 65 predetermines the first (closest to skirt) and second (farthest from skirt, as shown in FIGS. 4 and 6) selection positions of shift-knob 59. In said second selection position of shift-knob 59, spool-gear 48 is disengaged from said drive-gear and engaged with pawl 63 while bail-gear 49 is disengaged from pawl 64 and engaged with said drive-gear; pawl 63 permits rotation of spool-gear 48 and spool 42 only in clockwise direction; bail-gear 49 may be rotated by crank 45 in counterclockwise direction or said bail-gear may be caused to rotate clockwise by so-rotating bail 50, due to tension of line 43 caused by an out-running fish, against insufficient drag means adjustment. In said first selection position of shift-knob 59, bail-gear 49 is disengaged from drive-gear 47 and engaged with pawl 64 while spool-gear 48 is disengaged from pawl 63 and engaged with drive-gear 47; pawl 64 permits rotation of bail-gear 49 and bail 44 only in counterclockwise direction; spool-gear 48 may be rotated by crank 45 in clockwise direction or said spool-gear may be caused to rotate counterclockwise by so-rotating spool 42 and retaining-nut 66, due to an out-running fish or other cause of pull on line 43, against insufficient drag meand adjustment.

Conventional snap-rings secure slide-arm 51 to spool-shaft 52, yoke 61 to drive-selector rod 60 and spool-gear 48, and yoke 62 to said rod 60 and bail-gear 49. A conventional snap-ring with spacer-washer 67 retains sleeve of skirt 50 in anti-friction bearing 68 of gear-case 65.

The present reel is particularly adapted to the winding and unwinding of a relatively massive fly-line in combination with the easy retrieval and axial release of the trailing and attached monofilament. Referring to FIGS. 1 and 2, when shift-knob 56 is in its left-most position and crank 45 is rotated, the trailing monofilament is wound onto non-rotating spool 42 by rotating a skirt-carried bail 44 via gears 47 and 49 while gear 48 is engaged and retained by pawl 63. When shift-knob 56 is in its right-most position, the shooting-head is wound and unwound without axial line-twist only by rotation of spool 42 relative to stationary bail 44 via gears 47 and 48 while gear 49 is retained by engaged pawl 64.

In fly-fishing, to prepare for a forward cast with the invention:

(1) mount foot 41 of reel in conventional reel-seat;

(2) with shift-knob 59 in said first selection position, strip leader and shooting-head from spool 42, past bail 44 positioned as shown in FIG. 2, with line 43 having sufficient tension to cause said spool to rotate counter-clockwise against friction torque set by drag adjusting means;

(3) conventionally thread leader and shooting-head through rod-guides and attach fly to free end of leader;

(4) move shift-knob 59 to said second selection position and swing bail 44 around conventional screws in skirt 50 to conventional open-position; and, (5) holding line 43 from spool 42 with sufficient slack in left-hand, false cast and feed out said line until full length of said shooting-head is beyond fly-rod tip.

Conventional false casts and a forward cast are made with or without double-hauls. At instant of maximum forward velocity attained by shooting-head, release of left-hand grasp is made of said monofilament, which uncoils from and axially leaves spool 42, being pulled by said shooting-head of significant mass during trajectory of said forward cast.

When a fish strikes, it is played off said reel in conventional spinning-reel manner with shift-knob 59 in second selection position; which causes bail 44 to be driven counterclockwise by crank 45 via said adjustable drag means. When butt-end of said shooting-head is retrieved to bail 44, said shift-knob is moved to said first selection position. Thereafter, until fish is either taken or released, line 43 is retrieved without imparting twist by turning crank 45 clockwise, causing spool 42 to rotate clockwise while bail 44 is prevented from so rotating by said bail stop means. Said drag means permit counterclockwise rotation of spool 42, for out-running fish, to release line 43 without imparting axial twist to said line.

Having thus described the invention, it is understood that certain modifications in construction and arrangement of parts thereof will be made, as deemed necessary, without departing from the scope of the appended claims.

I claim:

1. A fishing reel comprising a gear casing, crank means carried by the gear casing, hollow bail means open at both ends, means rotatably mounting the bail means on said gear casing, spool means, means rotatably and reciprocally mounting the spool means concentrically in said bail means with the spool means suitably projecting from both ends thereof for reciprocation and rotation of said spool means within said bail means and for rotation of said bail means about said spool means, spool gear means, means reciprocally mounting the spool gear means on said spool means for possible engagement with said crank means, bail gear means, means reciprocally mounting the bail gear means on said bail means for possible engagement with said crank means, spool stop means, means mounting the spool stop means on said gear casing for possible engagement with said spool gear means, bail stop means, means mounting the bail stop means on said gear casing for possible engagement with said bail gear means, drive selector means, means rotatably mounting one end of the drive selector means on said spool gear means and the other end on said bail gear means, means reciprocally mounting said drive selector means on said gear casing with portion of former suitably projecting through a side wall of latter; said drive selector means having first and second reciprocal positions relative to said gear casing, respectively closer to and farther from said bail means; whenever said drive selector means is in said first position, said bail gear means is engaged with and held stationary by said bail stop means while said spool gear means is engaged with said crank means, to be rotated by said crank means in predetermined direction, with said spool means, when said crank means is rotated in conventional direction; and whenever said drive selector means is in said second position, said spool gear means is engaged with and held rotationally stationary by said spool stop means while said bail gear means is engaged with said crank means, to be rotated by said crank means opposite to said predetermined direction, with said bail means, when said crank means is rotated in conventional direction.

* * * * *